United States Patent [19]

Nozawa et al.

[11] 4,402,051
[45] Aug. 30, 1983

[54] METHOD FOR CARRYING OUT A CUTTING WORK IN MACHINING USING NUMERICAL DATA

[75] Inventors: Ryoichiro Nozawa; Mitsuō Matsui, both of Tokyo, Japan

[73] Assignee: Fujitsu Fanuc Limited, Tokyo, Japan

[21] Appl. No.: 250,597

[22] Filed: Apr. 3, 1981

[30] Foreign Application Priority Data

Apr. 4, 1980 [JP] Japan .................................. 55-43445

[51] Int. Cl.³ .............................................. G06F 15/46
[52] U.S. Cl. ................................ 364/475; 33/174 PC; 318/572; 318/578; 364/520; 364/191
[58] Field of Search ........ 364/474, 475, 520, 167–171, 364/191–193; 318/568, 572, 578, 162; 409/118, 119, 120; 33/174 L, 174 P, 174 PA, 174 PC

[56] References Cited

U.S. PATENT DOCUMENTS

| | | | |
|---|---|---|---|
| 3,226,833 | 1/1966 | Lemelson | 33/174 PC X |
| 3,840,994 | 10/1974 | Izumi et al. | 33/174 L X |
| 3,904,944 | 9/1975 | Carrick et al. | 318/578 |
| 4,159,429 | 6/1979 | Migliardi et al. | 318/578 X |
| 4,195,250 | 3/1980 | Yamamoto | 318/572 X |
| 4,296,473 | 10/1981 | Imazeki et al. | 364/520 |

*Primary Examiner*—Joseph F. Ruggiero
*Attorney, Agent, or Firm*—Armstrong, Nikaido, Marmelstein & Kubovcik

[57] ABSTRACT

A method for carrying out a cutting work using the numerical data obtained from a tracing of a model by stylus means, said numerical data being obtained by applying a proportional allotment to a first and second numerical data related to a first and a second stylus, in accordance with the radius of the cross-section of a cutting tool.

4 Claims, 3 Drawing Figures

METHOD FOR CARRYING OUT A CUTTING WORK IN MACHINING USING NUMERICAL DATA

TECHNICAL FIELD

The present invention relates to a method for carrying out a cutting work in machining using the numerical data obtained from the tracing of a model by stylus means.

BACKGROUND ART

In general, in the process of producing numerical data, which is obtained from the tracing of a model by stylus means and is used for in the subsequent cutting work, the profile of a model is continuously traced and the produced trace data is processed by means of calculation so that a numerical data for the subsequent cutting work is obtained. In view of the fact the precision of the cutting work is deteriorated when the cutting work is carried out using erroneous numerical data from the tracing of the model with a trace error, a prior art method of numerically controlled cutting work has been proposed in which the numerical data is corrected by the data corresponding to the error. This prior art method is described, for example, in Japanese Patent Publication No. 51-46311.

There is another problem in correcting the radius of the cross-section of a cutting tool. That is, when the radius of the cross-section of a cutting tool is different from that of a stylus, it is necessary to correct the value of the radius of the cutting tool and carry out the cutting work using said corrected value of the radius of the cutting tool.

To solve this problem, a prior art method of the correction of the radius of the cutting tool has been proposed in which the calculation of the value is conducted in the direction of the vector of the trace deflection and the correction of the radius of the cutting tool is carried out using the result of said calculating. However, it sometimes happens that an incorrect value of the trace deflection is obtained, and only the unidimensional trace deflection is obtained with the unidimensional tracer, and hence no direction is found for carrying out three dimensional correction. Under these circumstances, no correct calculation of the data can be carried out. Therefore, such prior art method does not provide a satisfactory solution of the problem.

DISCLOSURE OF THE INVENTION

It is the main object of the present invention to conduct an exact calculation for the correction of the radius of the cutting tool, to obtain a suitable numerical data for the cutting work and to carry out the precise cutting work using said obtained numerical data.

In accordance with the present invention, there is provided a method for carrying out a cutting work in machining using the numerical data obtained from a tracing of a model by stylus means, characterized in that: said method comprises the steps of applying a first and a second stylus to a model, producing a first and a second numerical data by having said first and second styluses trace said model, obtaining the desired numerical data by applying a proportional allotment procedure to said first and second numerical data in accordance with the value of the radius of the cross-section of a cutting tool, and executing a cutting work using the above obtained numerical data and said cutting tool.

DESCRIPTION OF THE PREFERRED EMBODIMENTS

Figure 1:
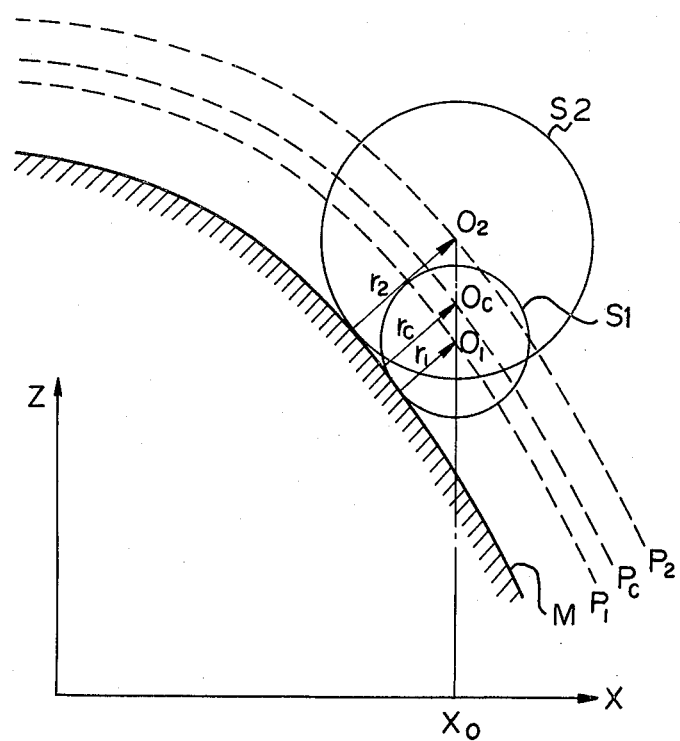
FIG. 1 illustrates the tracing paths of the styluses in accordance with an embodiment of the present invention.

The tracing paths of styluses S1 and S2 used for obtaining the numerical data in accordance with an embodiment of the present invention are illustrated in FIG. 1. The numerical data $P_1$ representing the path of the tracing operation of the center of the stylus S1 having the cross-section of a small radius $r_1$ is produced as the stylus S1 traces the contour of the model M. After that, the numerical data $P_2$ representing the path of the tracing operation of the center of the stylus S2 having the cross-section of a large radius $r_2$ is produced as the stylus S2 traces the contour of the model M. The radius $r_1$ corresponds to the minimum possible radius of the cross-section of the cutting tool, while the radius $r_2$ corresponds to the maximum possible radius of the cross-section of the cutting tool.

It is presumed that the tracing operations of the styluses S1 and S2 are carried out in the direction of the X axis. The data $(X_0, Z_1)$ representing the numerical data of the center $O_1$ of the small radius stylus S1 corresponds to the data $(X_0, Z_2)$ representing the numerical data of the center $O_2$ of the large radius stylus S2, with respect to the reference point $X_0$ on X axis.

Using the point $X_0$ as the reference point, a proportional allotment of the distance $O_1-O_2$ is conducted with regard to the value $r_c$ which is the radius of the cross-section of the cutting tool. When the X, Z coordinates of the centers of the small and the large radius styluses S1 and S2 are $(X_0, Z_1)$ and $(X_0, Z_2)$, respectively, and the X, Z coordinates to be obtained of the position $O_c$ representing the center of the cutting tool is $(X_0, Z_c)$, the value $Z_c$ is calculated by the proportional allotment expressed in the following equation.

$$Z_c = \frac{Z_1 - Z_2}{r_1 - r_2}(r_c - r_1) + Z_1$$

Thus, the numerical data $P_c$ representing the corrected path of the desired operation of the center of the cutting tool is obtained by using the above obtained value $Z_c$.

Figure 2:
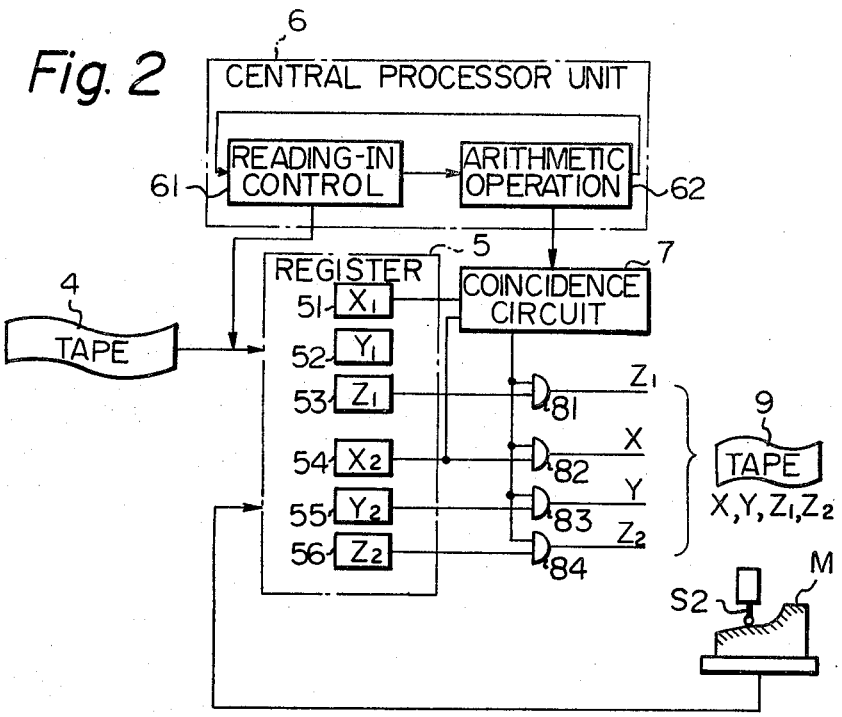
FIG. 2 illustrates the circuit used for obtaining the numerical data in accordance with an embodiment of the present invention.
Figure 3:
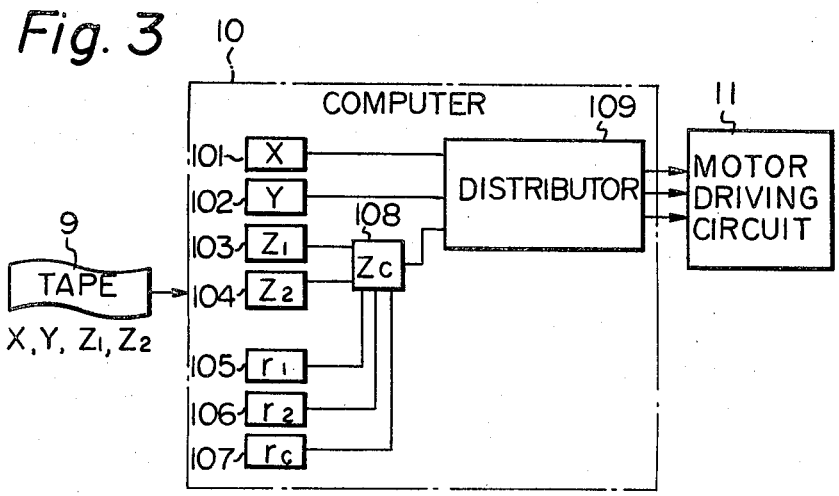
FIG. 3 illustrates the circuit used for carrying out cutting work using the obtained numerical data.

A circuit used for obtaining the numerical data using the above indicated equation and for carrying out cutting work using the obtained numerical data in accordance with an embodiment of the present invention is illustrated in FIGS. 2 and 3. The circuit of FIG. 2 is used for obtaining numerical data stored in the tape 9, while the circuit of FIG. 3 is used for carrying out a cutting work using the above obtained tape 9.

The numerical data regarding the tracing path of the small radius stylus S1 stored in the tape 4 is supplied to the register elements 51, 52 and 53 for storing $X_1$, $Y_1$ and $Z_1$ of the register 5 under the control of the output of the reading-in control circuit 61 of the central processor unit 6. Also, the numerical data regarding the tracing path of the large radius stylus S2 is supplied to the register elements 54, 55 and 56 for storing $X_2$, $Y_2$ and $Z_2$ of the register 5.

A coincidence circuit 7 receives the data $X_1$ and $X_2$ from the register elements 51 and 54 and, under the control of the output of the arithmetic operation circuit 62, produces a signal representing the detection of the coincidence of the X axis coordinates which is supplied to one side of the input terminals of AND gates 81, 82, 83 and 84. The data $Z_1$, $X_2$, $Y_2$ and $Z_2$ are supplied to the other side of the input terminals of the AND gates 81 through 84. Then, the numerical data (X, Y, $Z_1$, $Z_2$) of the small and the large radius styluses S1 and S2 are produced from the AND gates 81 through 84 and are stored in the tape 9.

In the execution of a cutting work, the data (X, Y, $Z_1$, $Z_2$) read-out from the tape 9 is supplied to a computer 10, as illustrated in FIG. 3. The computer 10 carries out the calculation in accordance with the above indicated equation, using the values $Z_1$, $Z_2$, $r_1$, $r_2$ and $r_c$ stored in the register elements 101 through 107, so that the value $Z_c$ is obtained and stored in a register element 108. The thus obtained numerical data X, Y, $Z_c$ are supplied to a distributor circuit 109 which produces a signal for instructing the operation of the cutting tool. The produced instruction signal is supplied to a motor driving circuit 11 so that the desired cutting work is carried out.

We claim:

1. A method for carrying out a cutting work by machining and using desired numerical data obtained from a tracing of a model by stylus means, characterized in that:

said method comprises the steps of applying a first and a second stylus to a model, producing a first and second numerical data by having said first and second styluses trace said model, obtaining the desired numerical data by applying a proportional allotment procedure to said first and second numerical data in accordance with the value of the radius of the cross-section of a cutting tool, and executing a cutting work by machining, using the above obtained desired numerical data and said cutting tool, wherein the nature of the cross-section of the first stylus, the second stylus and the cutting tool are used to position the tool.

2. The method of claim 1 in which the styluses are applied to the model with different values of stylus, radii cross-sections.

3. The method of claim 2 in which the steps of applying the first and second styluses to the model are performed sequentially.

4. Apparatus for obtaining desired numerical data from a tracing model comprising:
   (a) means for producing said first and second numerical data having first and second styluses forming cross-sections of different values of radii for producing the data by tracing the model, said means including a cutting tool; and
   (b) means for obtaining the desired numerical data by applying a proportional allotment to the first and second numerical data in accordance with the values of the radii of the cross-sections of the respective styluses and the cutting tool.

* * * * *